(12) United States Patent
Mandaric

(10) Patent No.: US 7,752,767 B2
(45) Date of Patent: Jul. 13, 2010

(54) DEVICE FOR SIMULATING POSITION OF THE SADDLE AND HANDLEBAR ASSEMBLY OF THE BICYCLE

(76) Inventor: Veselin Mandaric, 1088 Deer Spring Rd., San Marcos, CA (US) 92069

( * ) Notice: Subject to any disclaimer, the term of this patent is extended or adjusted under 35 U.S.C. 154(b) by 833 days.

(21) Appl. No.: 11/589,272

(22) Filed: Oct. 27, 2006

(65) Prior Publication Data

US 2009/0126211 A1 May 21, 2009

(51) Int. Cl.
*G01B 5/25* (2006.01)
(52) U.S. Cl. .............................. 33/512; 33/549; 33/288
(58) Field of Classification Search .................. 33/512, 33/832, 1 BB, 472, 473, 549, 288; 280/281.1, 280/288.4; 74/586, 594.1
See application file for complete search history.

(56) References Cited

U.S. PATENT DOCUMENTS

| | | | | |
|---|---|---|---|---|
| 4,938,475 | A * | 7/1990 | Sargeant et al. ................ 482/9 |
| 5,240,417 | A * | 8/1993 | Smithson et al. .............. 434/61 |
| 5,694,699 | A * | 12/1997 | Folson .......................... 33/645 |
| 6,470,591 | B2 * | 10/2002 | Rutkowski ................... 33/832 |
| 6,658,750 | B2 * | 12/2003 | Scheibner et al. ............ 33/288 |
| 6,839,976 | B2 * | 1/2005 | Winkenbach et al. ......... 33/549 |
| 7,467,478 | B1 * | 12/2008 | Williams ..................... 33/608 |
| 7,526,874 | B2 * | 5/2009 | Okura et al. .................. 33/613 |
| 2004/0237666 | A1 * | 12/2004 | Winkenbach et al. .... 73/862.49 |
| 2007/0003910 | A1 * | 1/2007 | Kirila ........................... 434/61 |
| 2007/0142177 | A1 * | 6/2007 | Simms et al. ................. 482/8 |
| 2008/0058170 | A1 * | 3/2008 | Giannascoli et al. .......... 482/57 |

* cited by examiner

*Primary Examiner*—G. Bradley Bennett
*Assistant Examiner*—Tania C Courson

(57) ABSTRACT

The invention is a bicycle rider fitting machine. It is used for finding optimal position of the rider on future bicycle/frame, based on parameters obtained during the workouts. Based on workout results like heart rate, power, speed, cadence, etc., what can be measured by integrated or independent electronic measuring devices, someone can compare those results and conclude the best possible positions of saddle and handlebars for particular rider.

It is an apparatus that can simulate almost any position of the bicycle saddle and handlebar assembly with the reference to the Bottom Bracket centre (FIG. 1-4) as a starting 0/0 position. The saddle (FIG. 1-1) and handle bar assembly (FIG. 1-2) can be moved independently with respect to the bottom bracket. The obtained position of the saddle and handlebar position can be easily recorded for future adjustments of the machine, by means of Horizontal (X) Scales (FIG. 1-3) on the Seat Slider (FIG. 1-5) and Handlebar Slider (FIG. 1-6) and by means of Vertical (Y) scale (FIG. 1-7) on the Seat Tube (FIG. 1-8) and Handlebar Tube (FIG. 1-9) vertical scale (FIG. 1-10). The obtained measurements are of use in the design and fit of a bicycle to a particular individual.

17 Claims, 2 Drawing Sheets

DEVICE FOR SIMULATING POSITION OF THE SADDLE AND HANDLEBAR ASSEMBLY OF THE BICYCLE

BACKGROUND

1. Field of the Invention

The invention relates to a Fitting Machines and/or stationary exercise bicycles that are used in specialized bicycle shops for the purpose of simulating position of the rider on the bicycle, (either with power load generator or without). Such machines have movable parts attached to each other in some correlation to the Bottom Bracket thus creating/simulating the most desirable/proper position for the rider. Findings/results of such tests are used to set-up geometry of a real bike for each specific rider.

2. Description of Prior Art

Presently there are number of Fit Machines available on the market, all of them using rotating seat tube (around BB centre) for the adjustment of the Seat Tube Angle. Seat Tube angle is angle of the centre line of the Seat Tube, measured from the horizontal line drowns from the BB centre. Such rotating movement has the undesired byproduct of also rotating the saddle, which is attached to the rotating tube, around the BB Centre. This creates unnecessary work for the operator to adjust the saddle back to a perfect horizontal position after any change of the Seat Tube angle. The saddle horizontal, leveled position is a crucial part of the fitting process and must be maintained at all times, for correct fit and a future frame design. In process of adjusting the saddle back in a horizontal position, the saddle has to be unbolted from its holder, realigned, and re-bolted to the holder. Adjusting a saddle tilt also creates additional task—to note the position of the saddle on the holder after every seat tube angle adjustment. Present machines also utilize only one round seat tube, what also incorporate telescopic sliding seat holding part, and in any extending or contracting of saddle distance from the BB, saddle assembly needs to be aligned to the vertical plane of the machine.

Further more, even though the distance from the BB to the top of the saddle can be measured, actual horizontal distance of the saddle to the bottom bracket remains unknown, as there is no measuring device on such machines what would clearly determine saddle position in X and Y plane relative to the BB.

Present machines also usually don't have any kind of measuring devices or marks for Handlebar assembly positioning/reading in correlation to the BB, but rather tape or long ruler must be used to measure two-dimensional position, what creates impossibility to recreate the same position, or organize a drawing, as one of those parameters are missing, not measurable or have to be approximated.

DESCRIPTION OF THE PRESENT INVENTION

The present invention is a machine that allows completely independent adjustment of all aspects of the bicycle fit seat tube angle, saddle angle and position, and handlebar position, relative to the BB centre. An adjustment of any of these does not result in the need to make compensatory adjustments in any other.

Furthermore, the absolute position of each of the adjustable components is measurable with a ruled scale imprinted on the machine. This improvement on the state of the art allows for more rapid and accurate fit of the rider to the bicycle. As a saddle only slides horizontally it is keeping perfect horizontal position, same as the first time when is positioned on the cradle. No adjustment of the saddle tilt is ever necessary, regardless how many times saddle changes its Seat Angle. As the saddle moves vertically on two telescopic tubes (rather than just one, on Present Art) there is no possibility of spinning of the saddle assembly around the tube and that completely reduce a need for saddle alignment to the vertical plane (Line from front to rear wheel) of the bike. In addition, the telescoping double bars enhance stability of saddle which is important for fitting riders while pedaling under load.

Machine frame (FIG. 1-12) is of welded tubular structure, with a pair of vertical tubing, Frame Head Tubes (FIG. 1-17) and Seat Tubes (FIG. 1-18), are connected together with a bracing tubing. Through vertical pair of frame Head Tubes (FIG. 1-17) telescopically slides pair of handlebar tubing (FIG. 1-9) what are connected on the top with Handlebar Slide assembly (FIG. 1-13). On the Handlebar Slide is attached movable Handlebar Cradle (FIG. 1-16).

Figure 1:
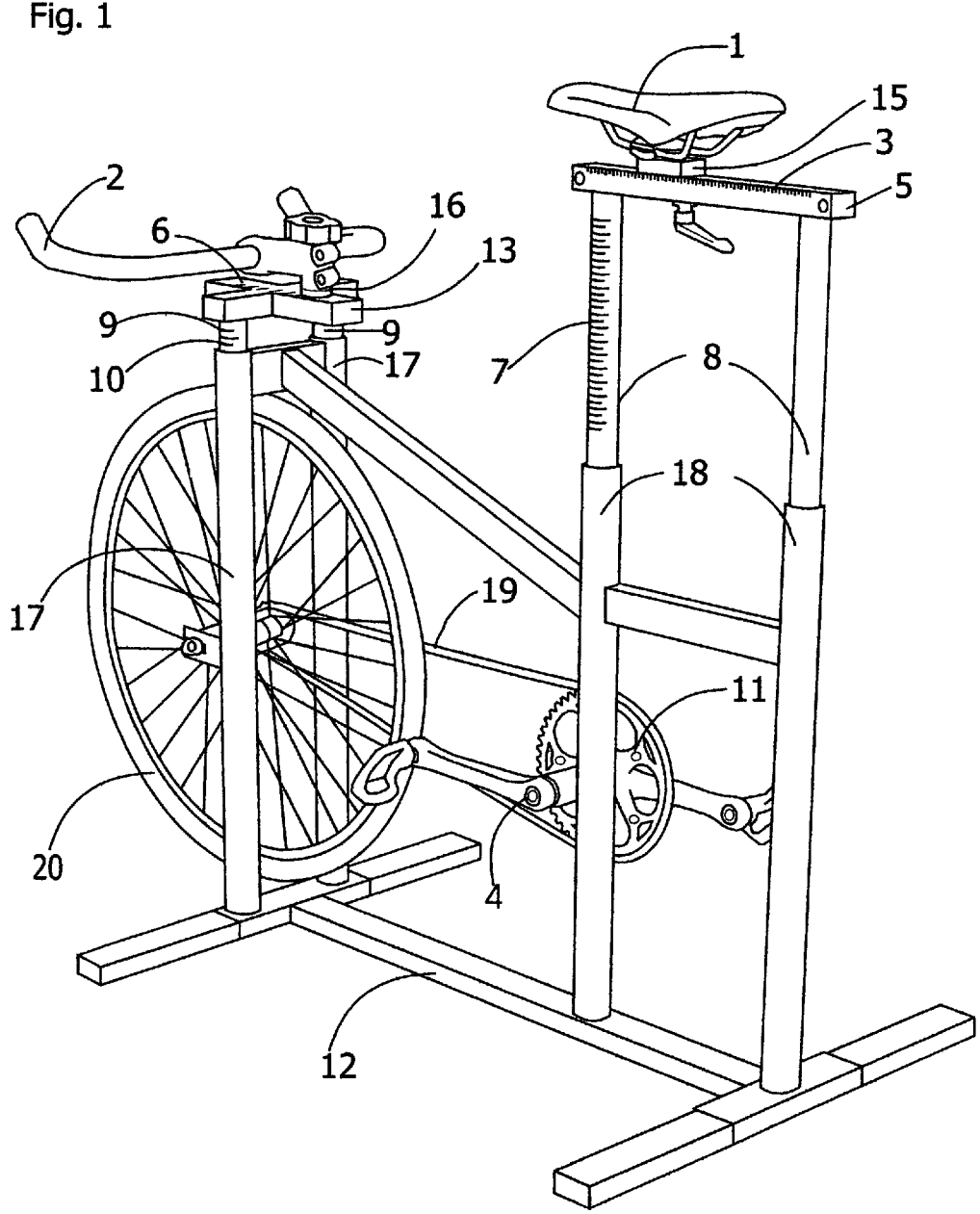
FIG. 1
Figure 2:
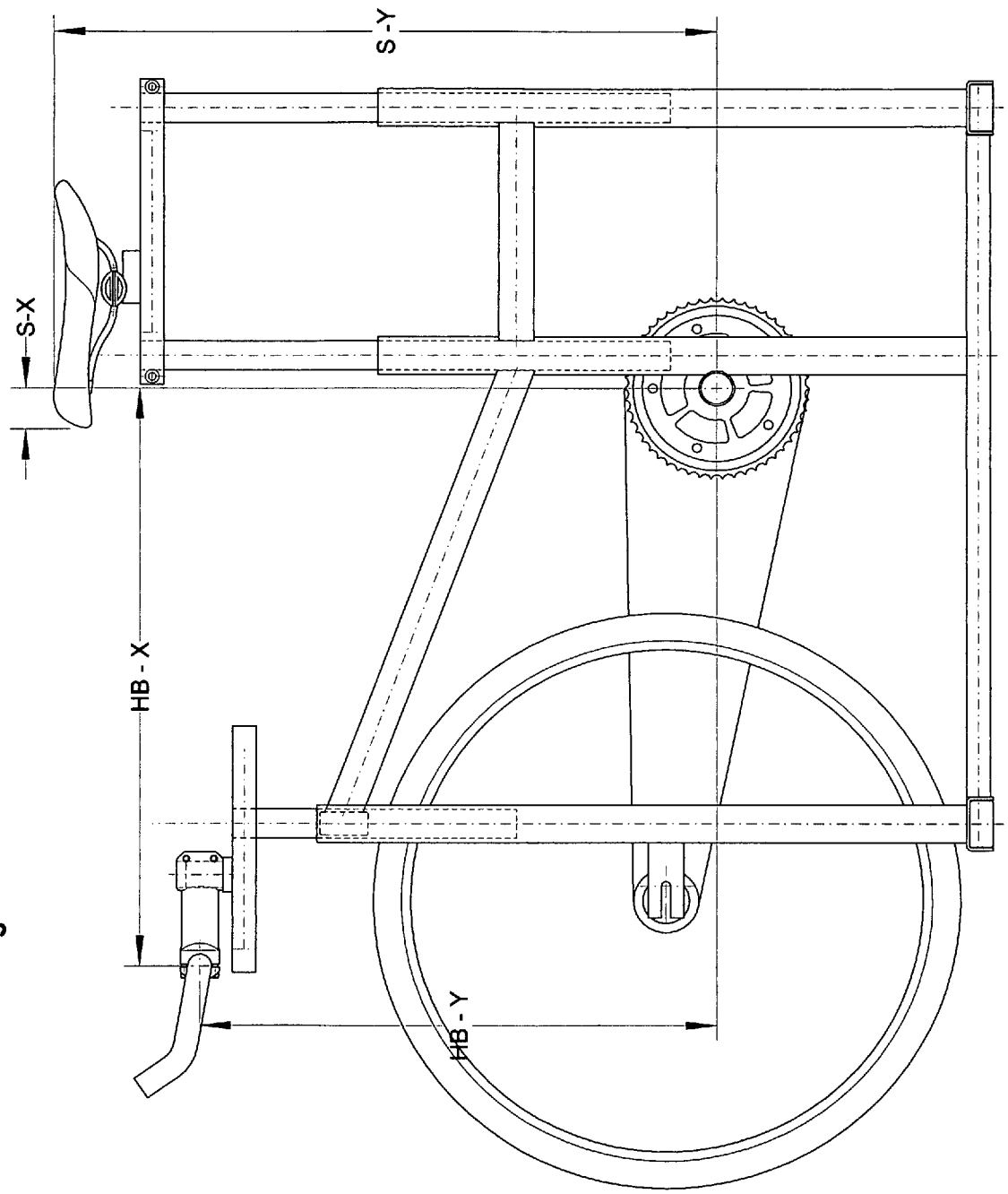

Through vertical pair of frame seat tubes (FIG. 1-18) telescopically slides pair of seat tubing (FIG. 1-8) what are connected on the top with horizontal Saddle Slide (FIG. 1-5). On the Saddle Slide is attached movable Saddle Cradle (FIG. 1-15) holding a Saddle (FIG. 1-1).

Bottom bracket of the frame (FIG. 1-4) is welded to the main frame and holds normal bicycle cranks (FIG. 1-11), what are turning by chain (FIG. 1-19) rear bicycle wheel (FIG. 1-20)

FIG. 2

Reading of saddle and handlebar position is possible in X/Y—Absolute coordinate system. Saddle horizontal position (FIG. 2 S-X) is determined by finding reading on horizontal scale (FIG. 1-3) and saddle vertical distance (FIG. 2 S-Y) is determined by finding reading on vertical scale (FIG. 1-7).

Same is for handlebar assembly, horizontal position (FIG. 2 HB-X) is determined by finding reading on horizontal scale (FIG. 1-6) and vertical distance (FIG. 2 HB-Y) is determined by finding reading on vertical scale (FIG. 1-10).

What is claimed is:

1. A bicycle rider fitting machine, comprising a saddle, a handlebar assembly and a pedal assembly, the saddle being independently adjustable in one or more directions with respect to a bottom bracket position so that any adjustment of the saddle in any one direction does not affect any other adjustment parameter of the saddle; where the saddle is mounted on a pair of perpendicular and vertical telescopic parallel tubes or rods which enable adjustment of the saddle in the vertical direction, and a horizontal sliding assembly allowing adjustment of the saddle in the horizontal direction with respect to the parallel tubes.

2. A bicycle rider fitting machine as in claim 1, where the saddle position adjustments, with respect to the bottom bracket, do not affect the tilt or rotation of the saddle.

3. A bicycle rider fitting machine as in claim 2, the saddle being independently adjustable in the forward/backward and up/down positions.

4. A bicycle rider fitting machine as in claim 1, the saddle being independently adjustable in the angle around the bottom bracket, the tilt angle of the saddle from horizontal being unchanged in this process.

5. A bicycle rider fitting machine in claim 1, with handlebar adjustment independent of saddle adjustment position, with respect to the bottom bracket position.

6. A bicycle rider fitting machine as in claim 1, with handlebar adjustment in up/down and forward/backward positions with respect to the bottom bracket position, and independent of the saddle position.

7. A bicycle rider fitting machine as in claim 1, with one or more integrated measurement devices to measure the positioning of the saddle or the handlebar assembly with respect to a reference point.

8. A bicycle rider fitting machine as in claim 1, with one or more integrated measurement devices to measure the positioning of the saddle or the handlebar assembly with respect to the bottom bracket in a coordinate system including, but not limited to, an X/Y coordinate system where one coordinate is vertical and one is horizontal.

9. A bicycle rider fitting machine as in claim 1, with one or more ruled scales as integrated measurement devices to measure the positioning of the saddle or the handlebar assembly with respect to the bottom bracket.

10. A bicycle rider fitting machine as in claim 1, with integrated measurement devices to measure the positioning of the saddle or the handlebar assembly in a coordinate system different from the adjustment directions of the saddle or the handlebars if they are also adjustable.

11. A bicycle rider fitting machine as in claim 1, additionally comprising:
   a) a stationary frame assembly having a pair of telescopic parallel vertical tubes connected on the top by means of horizontal plate handlebar slide carrying handlebars, and a pair of telescopic parallel vertical tubes connected on the top with horizontal plate saddle slide carrying the saddle;
   b) a horizontal saddle cradle and a handlebar cradle positioning;
   c) horizontal scales printed on the sliders and vertical scales printed on the tubes, in correlation to the Bottom Bracket centre as an X/Y 0/0 point, vertical and horizontal scales being perpendicular to each other, thus creating an XY plane.

12. A bicycle rider fitting machine, comprising a saddle, a handlebar assembly and a pedal assembly, the handlebar assembly being independently adjustable in one or more directions with respect to a bottom bracket position without adjusting the rotation of the handlebars; where the handlebars are mounted on a pair of perpendicular and vertical telescopic parallel tubes or rods which enable adjustment of the handlebars in the vertical direction, and a horizontal sliding assembly allowing adjustment of the handlebars in the horizontal direction with respect to the parallel tubes.

13. A bicycle rider fitting machine as in claim 12, where the handlebar adjustments, with respect to the bottom bracket or the saddle, do not affect the rotation of the handlebars.

14. A bicycle rider fitting machine as in claim 13, the handlebar assembly being independently adjustable in the forward/backward and up/down positions.

15. A bicycle rider fitting machine as in claim 12, the saddle being independently adjustable with respect to the handlebar assembly position and with respect to the bottom bracket position.

16. A bicycle rider fitting machine as in claim 12, with one or more integrated measurement devices to measure the positioning of the handlebars or the saddle with respect to a reference point.

17. A bicycle rider fitting machine as in claim 12, additionally comprising:
   a) a stationary frame assembly having a pair of telescopic parallel vertical tubes connected on the top by means of horizontal plate carrying handlebars and a pair of telescopic parallel vertical tubes connected on the top with horizontal plate carrying the saddle;
   b) horizontal sliding cradles for both saddle and handlebar positioning;
   c) horizontal scales printed on the Sliders and vertical scales printed on the Tubes, in correlation to the Bottom Bracket centre as an X/Y 0/0 point, vertical and horizontal scales being perpendicular to each other, thus creating an XY plane.

* * * * *